United States Patent [19]

Isaksson

[11] Patent Number: 5,726,973
[45] Date of Patent: Mar. 10, 1998

[54] METHOD AND ARRANGEMENT FOR SYNCHRONIZATION IN OFDM MODULATION

[75] Inventor: Mikael Isaksson, Lulea, Sweden

[73] Assignee: Telia AB, Farsta, Sweden

[21] Appl. No.: 669,379
[22] PCT Filed: Dec. 30, 1994
[86] PCT No.: PCT/SE94/01266
§ 371 Date: Aug. 22, 1996
§ 102(e) Date: Aug. 22, 1996
[87] PCT Pub. No.: WO95/19671
PCT Pub. Date: Jul. 20, 1995

[30] Foreign Application Priority Data

Jan. 18, 1994 [SE] Sweden .................. 9400116

[51] Int. Cl.⁶ .................. H04J 11/00
[52] U.S. Cl. .................. 370/203; 370/503; 375/344; 455/202
[58] Field of Search .................. 370/203, 208, 370/484, 503; 375/344; 455/192.2, 202, 257

[56] References Cited

U.S. PATENT DOCUMENTS 5,602,835  2/1997  Seki et al. .................. 370/206
5,608,764  3/1997  Sugita et al. .................. 375/344

FOREIGN PATENT DOCUMENTS 0 453 203 A2  4/1991  European Pat. Off.
92/05646      4/1992  WIPO
92/10043      6/1992  WIPO Primary Examiner—Hassan Kizou
Assistant Examiner—A. Brimoussa
Attorney, Agent, or Firm—Oblon, Spivak, McClelland, Maier & Neustadt, P.C.

[57] ABSTRACT

A method and an arrangement for synchronization in OFDM modulation. Frequency errors of an IF clock and a sampling clock are controlled by estimating the deviation of the sampling clock and, respectively, the IF clock for two subcarriers with different frequencies. According to the invention, the frequencies are chosen symmetrically around zero and the absolute phase errors are detected for both subcarriers. Timing errors and phase errors are formed from the absolute phase errors in order to generate two control signals. The first control signal is formed from the deviation of the sampling clock and the timing error for controlling the sampling clock while the second control signal is formed from the deviation of the IF clock and the phase error for controlling the IF clock.

19 Claims, 4 Drawing Sheets

| 1 | 2 | 3 | 4 | | N/2 | N/2+1 | | N-2 | N-1 | N |
|---|---|---|---|---|---|---|---|---|---|---|
| $f_0$ | $f_1$ | $f_2$ | $f_3$ | ——— | $f_{N/2-1}$ | $f_{-N/2}$ | ——— | $f_{-3}$ | $f_{-2}$ | $f_{-1}$ |
*FIG. 4*
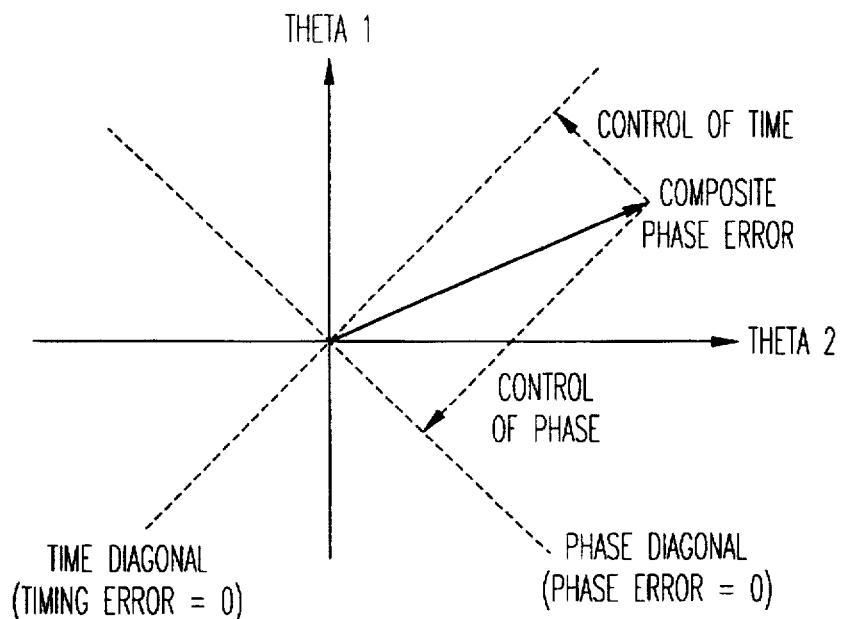
*FIG. 5*
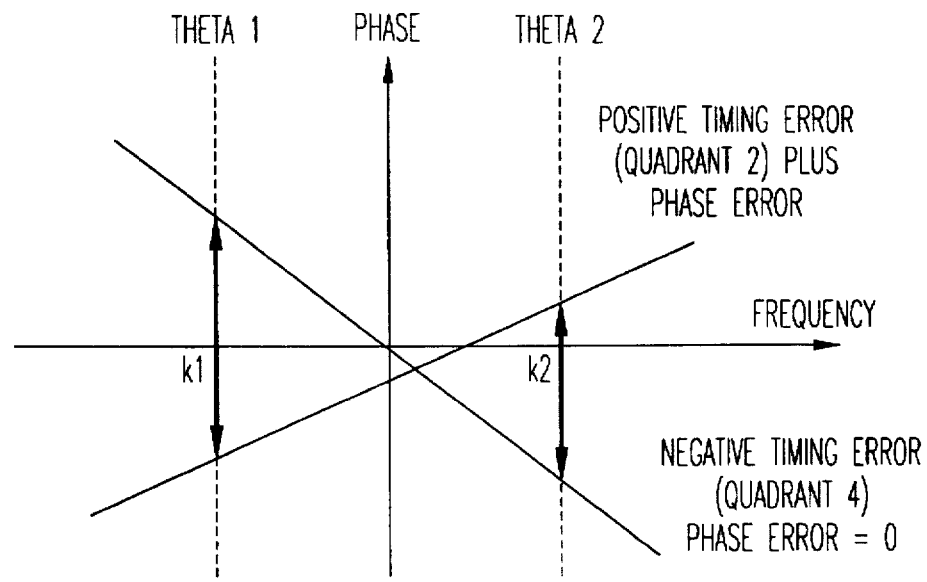
*FIG. 6*

METHOD AND ARRANGEMENT FOR SYNCHRONIZATION IN OFDM MODULATION

BACKGROUND OF THE INVENTION

1. Field of the Invention

The present invention relates to a method and an arrangement for detecting and synchronizing radio signals modulated according to OFDM (orthogonal frequency division multiplexing). The invention complements and simplifies a known method for frequency control of clocks for mixing down from intermediate frequency (IF) to baseband frequency and of clocks for the baseband signal. The known method does not include control of phase errors in the down conversion from IF and timing errors in sampling.

2. Discussion of the Background

OFDM is a digital modulation method for primarily radio signals when nearly all signal processing at the baseband is done with digital components such as signal processors and specific circuit solutions. The transmitted signal, however, is analog which is why a number of analog components are needed for processing the radio signal before conversion occurs to or from digital baseband representation. These analog components occur primarily in the upwards and downwards mixing of the signal to RF and IF, that is to say channel filtering and, respectively, sampling. A large proportion of the synchronization problems in the system originates from deviations or other departures in these components.

Previously known methods for controlling the synchronization are based on the utilization of two known symbols, subcarriers, in the OFDM frame. From the phase variation of these subcarriers the error signals for a control system for controlling the oscillators for further down conversion from IF and for sampling of the baseband signal are calculated. On demodulation of the OFDM frame in the receiver equipment, the frequency deviations of the sampling and IF clock have given rise to what is assumed to be a moderate phase shift of all subcarriers. In the method, the phase difference between two frames is measured and the phase difference used for estimating the total deviation of the signal. Since the method is based on differential phase measurement between data frames, this implies that when the frequency error has been controlled, the error lags in phase and time since these deviations have not been determined in absolute terms. The technical problem of the invention is therefore to produce an arrangement which involves detection of the absolute phase shift, that is to say the factual phase deviation in relation to the known phase.

Within this field, a number of documents is also known.

WO 92/05646 shows a receiver for receiving OFDM signals. The document discusses control of local oscillators and sampling clock.

U.S. Pat. No. 5,228,025 describes a method for sending digital data to mobile users with the aid of COFDM. According to the document, "service words" are used for controlling the local oscillator.

U.S. Pat. No. 5,206,886 relates to a method and a device for correcting, with the aid of a pilot tone, phase and frequency errors and for correcting clock errors in a multi-carrier wave modem.

U.S. Pat. No. 5,228,062 describes a method and a device for correcting phase and frequency errors and for correcting clock errors in a multi-carrier wave modem.

SUMMARY OF THE INVENTION

In brief, the solution comprises a method which is based on detecting absolute phase errors for both synchronization symbols and where the phase is controlled with the IF clock and the timing error is controlled with the sampling clock. This involves the IF signal being mixed down to the baseband. This is controlled by a numeric oscillator. On the basis of the difference between frequencies in a transmitter and receiver and instability in crystals, the down conversion frequencies are continuously controlled by digitally varying the frequency between the oscillators. After down conversion, two quadrature components are obtained which are then sampled into a digital representation via A/D converters. The sampling unit is controlled by an oscillator for being able to sample the signal at the correct time and, respectively, the correct frequency. By means of this control, the drift of the time and sampling frequency is controlled. The digital representation of the baseband signal is read in by an FFT processor which converts the time signal to the frequency domain. The subcarriers received in the OFDM frame are now at the respective frequency which has been calculated by the processor. To be able to generate the error signals for controlling, the two known carrier waves are demultiplexed by a demultiplexing unit. The two known carrier waves thus form an input signal for the arrangement for calculating the error signals.

The present invention thus provides a method for synchronizing in OFDM modulation, whereby the frequency error of an IF clock and a sampling clock is controlled by estimating the deviation of the sampling clock and of the IF clock for two subcarriers with different frequencies.

According to the invention, the frequencies are selected symmetrically around zero and the absolute phase errors are detected for both subcarriers so that timing errors and phase errors are formed for the absolute phase errors. First and second control signals are formed from deviation of the sampling clock and the timing error for controlling the sampling clock and, respectively, from the deviation of the IF clock and phase error for controlling the IF clock.

The invention also relates to an arrangement for carrying out the method. The invention is defined in greater detail in the patent claims following.

BRIEF DESCRIPTION OF THE DRAWINGS

The invention will now be described in detail with reference to the attached drawings, in which:

FIG. 4 is a diagram of an FFT frame, FIG. 5 is a diagram of a plane of complex numbers for timing errors and phase errors, FIG. 6 is a phase/frequency diagram for positive and, respectively, negative timing errors.

DETAILED DESCRIPTION OF A PREFERRED EMBODIMENT

To facilitate the understanding of the present invention, the known control method for controlling an IF clock and, respectively. sampling clock. which forms the basis of the present invention. is first described. This control method is a method for synchronizing in COFDM modulation which controls the frequency error of IF and sampling clock but does not control timing and phase errors. The method is based on utilizing two known symbols (subcarriers) in the FFT (Fast Fourier Transform) frame for estimating the deviations. From the differential phase variation of these symbols, the error signals are calculated for a simple controller system for controlling oscillators for down conversion from IF and for sampling of the baseband signal.

The two subcarriers for synchronizing are generated in the IFFT operation in the transmitter in the same manner and at the same time as the remaining data in the OFDM frame. The two frequencies utilized are called k1 and k2 and correspond to the index in the OFDM frame (FFT frame).

On demodulation of the OFDM frame in the receiver. the frequency deviation of the sampling and IF clocks has given rise to phase shifting of all symbols. The phase shifting is assumed to be moderate between the measurement points so that no phase variations greater than $2\pi$ occur. It is also assumed that the frequency drifts during an OFDM frame are approximately constant. that is to say regulation occurs for each frame.

In the method. the phase difference between two frames for k1 and k2 is measured and these phase differences are utilized for estimating the deviations. The phase shifting due to frequency drift in the IF clock and the phase shifting due to frequency drift in the sampling clock occur in two fundamentally different ways:

IF frequency drift: translation of all frequencies. Involves constant phase shifting for all symbols (frequencies) in the OFDM frame.

Sampling frequency drift: involves linear phase shifting for all symbols (frequencies) in the OFDM frame.

Figure 1:
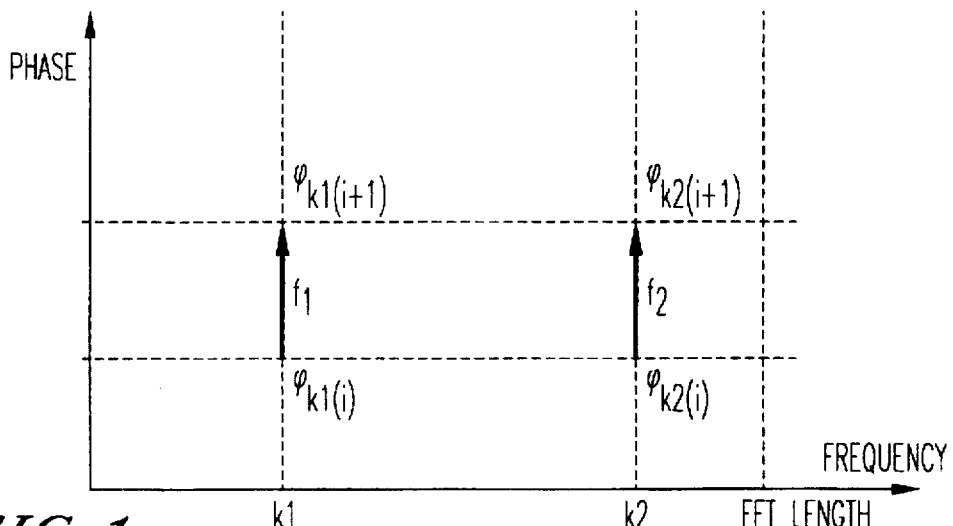
FIG. 1 is a diagram for constant phase shifting with deviation in an IF clock.

The phase variation for k1 and k2 with IF deviation is shown in principle in the phase/frequency diagram in FIG. 1 (no frequency error in the sampling clock).

The phase shift is constant for all frequencies, where $f1=f2=f$.

Figure 2:
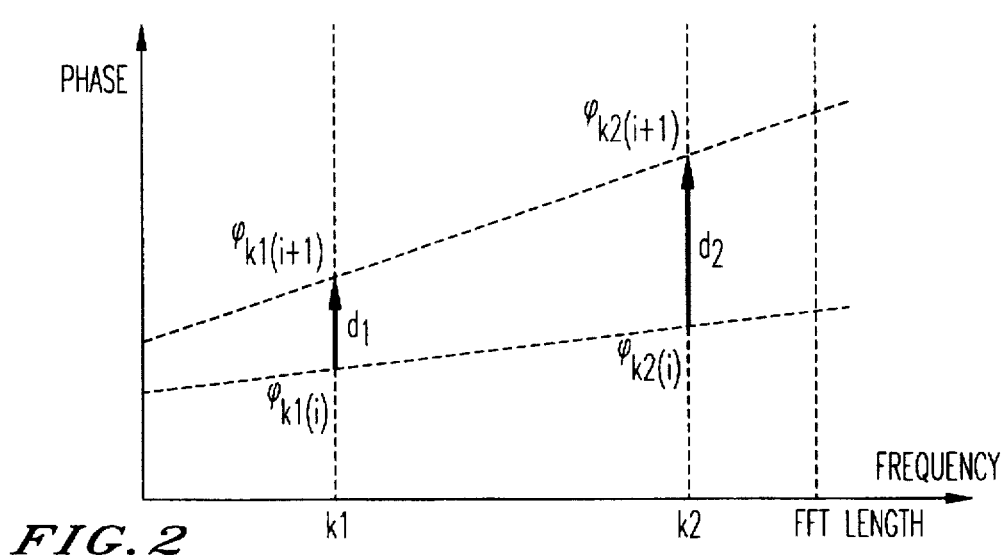
FIG. 2 is a diagram for linear phase shifting with deviation in a sampling clock.

The phase variation for k1 and k2 with deviation of the sampling frequency when the frequency error for IF is zero is shown in principle in FIG. 2.

Figure 3:
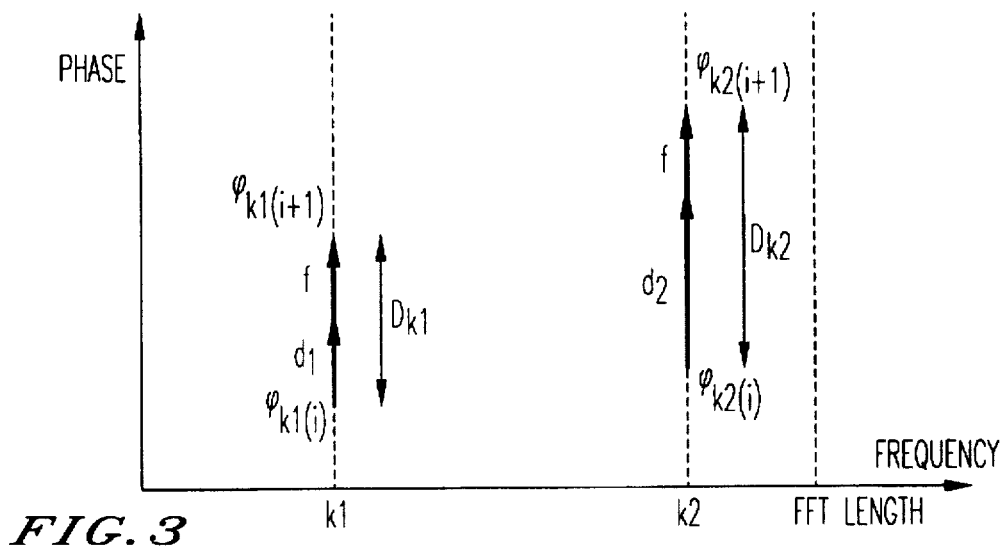
FIG. 3 is a diagram of composite phase shifting.

Since these deviations occur simultaneously and independently of one another, the composite phase shift will be the sum of both cases according to FIG. 3.

The total phase shift between two OFDM frames for frequencies k1 and k2 consists of a part f which is the same for k1 and k2 and is proportional to the frequency translation. The other parts d1 and d2 show the frequency deviation of the sampling clock between two frames. Since this deviation gives rise to a linear phase shift, this provides:

$$d1 = \text{const} \cdot d2$$

The total phase shift D can then be expressed as:

$$D_{k1} = \phi_{k1(t+1)} - \phi_{k1(t)} = d_1 + f$$

$$D_{k2} = \phi_{k2(t+1)} - \phi_{k2(t)} = d_2 + f$$

Estimation of the deviation of the sampling clock can be carried out simply by utilizing the fact that the phase shift f is the same for both frequencies k1 and k2. Take the difference between $D_{k1}$ and $D_{k2}$. For F1, this function is called:

$$F1 = D_{k1} - D_{k2} = (d_1+f) - (d_2+f) = d_1 - d_2$$

Since the phase shift is linear, the following holds true:

$$d_1/d_2 = k1/k2$$

which provides:

$$F1 = d_1 - d_1(k2/k1) = d_1/k1(k1-k2)$$

If the sampling frequency is called $$f_s' = (1+\delta_s)f_s$$

where $\delta_S$ is the deviation, this means that:

$$F1 = \delta_s \alpha (k1-k2)$$

where $\alpha$ is a positive constant.

In estimating the deviation of the IF clock. we begin by adding $D_{k1}$ and $D_{k2}$ and calling this function F2:

$$F2 = D_{k1} + D_{k2} = 2f + (d_1+d_2)$$

The function contains the sum of $d_1$ and $d_2$ which must be cancelled out. Utilize the known function F1 which only contains $d_1$ and $d_2$.

$$F2 = (D_{k1}+D_{k2}) - (D_{k1}-D_{k2})C$$

where C is a constant.

$$F2 = 2f + (d_1+d_2) - (d_1-d_2)C$$

assuming $$(d_1+d_2) - (d_1-d_2)C = 0$$

and that $$(d_2 = d_1(k2/k1))$$

gives that $$C = (k1+k2)/(k1-k2)$$

Thus.

$$F2 = (D_{k1}+D_{k2}) - (D_{k1}-D_2) \cdot (k1+K2)/(k1-k2) = (D_{k1}+D_{k2}) - F1 \cdot (k1+k2)/(k1-k2)$$

Since the earlier known control method is only based on differential phase measurement between data frames. this implies that when the frequency error has been controlled, an error in phase and in time remains. The method according to the invention complements the method of this type of control. The method is based on detecting the absolute phase error for both synchronization symbols as distinct from the original method which is based on differential detection of phase errors of the symbols. By absolute phase is meant the phase deviation from the known phase of k1 and k2. The phase is controlled with the IF clock whilst the timing error is controlled with the sampling clock.

For optimum operation of the method of the invention. the frequencies k1 and k2 will be selected symmetrically around the frequency zero which implies that k1=-k2. In a complex N-point FFT operation. the frequencies are calculated according to the index in FIG. 4.

The frequency for index 1 in the OFDM frame corresponds to the direct-voltage component. This is followed by positive frequencies up to the Nyquist frequency minus one. The negative frequencies begin with index N and back in the OFDM frame to index N/2+1.

The relation in the selection of the index for k1 and k2 therefore becomes:

index(k1)=N−index(k2)+2 where k1 represents the negative frequency.

The reasons for this choice of frequencies k1 and k2 is first and foremost that this provides the possibility of simultaneously controlling phase and time which is described below.

Furthermore, this choice of k1 and k2 results in a lower complexity of the frequency control. The error signal F2 for detecting of frequency errors in the IF clock includes compensation for the linear differential phase variation according to:

$$F2=(D_{k1}+D_{k2})-(D_{k1}-D_{k2})\cdot(k1+k2)/(k1-k2)$$

With k2=−k1, F2 is reduced to $$F2=D_{k1}+D_{k2}$$

A timing error in the sampling of the baseband signal entails that the symbols (frequencies) are given a linear phase shift. Even if the sampling occurs at the right frequency, this must also occur at the right time for this linear phase shift not to occur.

A phase error before sampling entails a constant phase shift of all symbols (frequencies). This error remains after control of the frequency of the IF clock.

As the phase shift is always linear for all combinations of both types of error, it is sufficient to study the phase shift for the two frequencies k1 and k2. The control method according to the invention is described most easily if we study the plane of complex numbers, the axes of which consist of the absolute phase error θ1 and θ2 for the symbols k1 and k2 (see FIG. 5). When sampling is done at the right time, the phase error will lie on the diagonal with the angle π/4 (time diagonal). A frequency error or a phase shift before sampling means that the error is located on the time diagonal. A correct phase before sampling means that a timing error is located on the diagonal with the angle 3π/4 (phase diagonal). In a normal case, both time and phase errors exist which implies that the composite phase error will be located at an arbitrary location in the plane of complex numbers.

In quadrant 1 and 3, the error therefore mainly consists of a positive or, respectively, negative phase error where phase control is mainly carried out. In quadrant 2 and 4, the error mainly consists of a negative or, respectively, positive timing error whereby time control is mainly carried out.

The error signal for time control is calculated as the distance from the time diagonal whilst the phase error is calculated as the distance from the phase diagonal. These errors can be simply calculated as:

timing error=θ2−θ1 phase error=θ1+θ2

To understand these simple relations, we describe the composite phase error θ in complex form:

θ=θ1+i·θ2

A negative phase shift of π/4 implies that the diagonals form new coordinate axes. This implies that the real and imaginary part of the error θ forms error signals. A phase shift with phase −π/4 can be carried out by complex multiplication of the error by the complex number on the unit circle which has this phase:

$$\begin{aligned}\theta' &= (1/\sqrt{2} - i\cdot 1/\sqrt{2})\cdot(\theta 1 + i\cdot\theta 2)\\ &= 1/\sqrt{2}\cdot(1-i)\cdot(\theta 1 + i\cdot\theta 2) =\\ &= 1/\sqrt{2}\cdot((\theta 1+\theta 2)+i\cdot(\theta 2-\theta 1))\end{aligned}$$

The real part is the distance from the phase diagonal whereas the imaginary part is the distance from the time diagonal. It is essential that k1 and k2 are chosen symmetrically around the zero frequency for the phase and time diagonals to intersect one another orthogonally at point zero in the plane of complex numbers. For simultaneous control of two clocks, it is especially important for the control to be balanced and not to give rise to the racing phenomenon between the two oscillators. A pure phase error moves along the phase diagonal whilst a pure timing error moves along the time diagonal. If we study these errors in the frequency/phase diagram, we see in FIG. 6 how a negative or, respectively, positive timing error occurs in quadrant 2 and, respectively, 4. If the phase error is zero, θ1=−θ2.

The phase error can also be read from the phase for frequency $f_0$. This is logical since this frequency corresponds to the direct-voltage component in the FFT operation. If the phase error is zero before sampling, variations in the sampling frequency and time will not affect the phase of the direct-voltage component.

Figure 7:
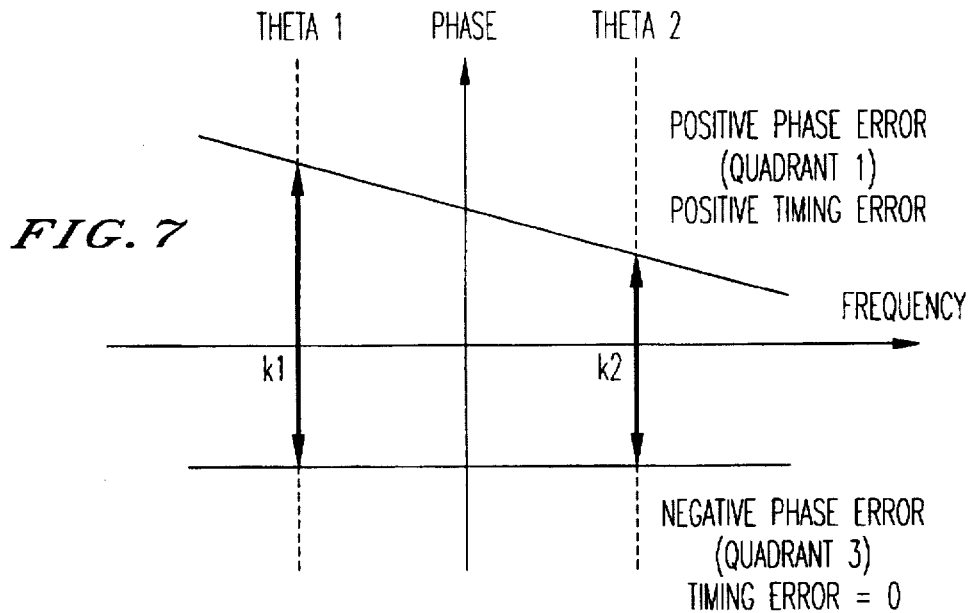
FIG. 7 is a phase/frequency diagram for positive and, respectively, negative phase errors.

Corresponding examples of phase errors in quadrant 1 and 3 (FIG. 7). If the timing error is zero, θ1 will be=θ2.

Figure 8:
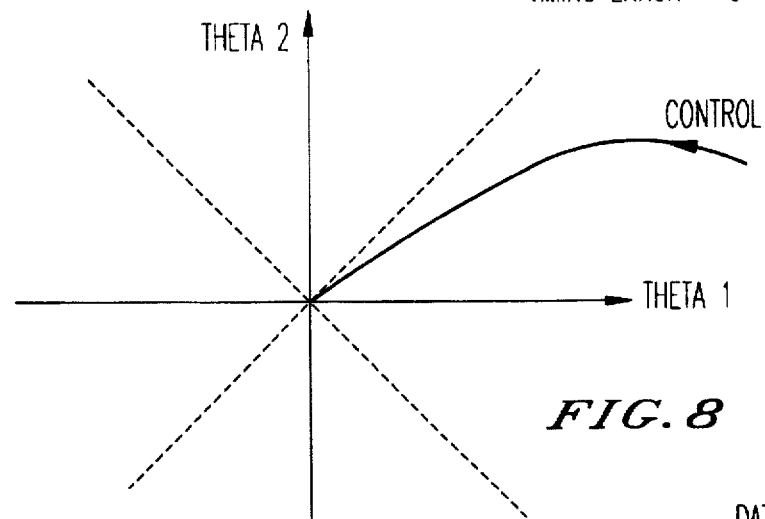
FIG. 8 is a diagram of the control of both phase errors and timing errors.

With a composite error, simultaneous control of both sampling and IF clock occurs. During the controlling, the error will converge towards zero along a path which does not follow any of the diagonals (FIG. 8). With an accurate adjustment of the integration constants it is possible to get the error to converge towards zero along the shortest path.

OFDM is a digital complex modulation method where, generally speaking, all signal processing at the baseband is done by digital components of the types of signal processors, FFT processors and specific circuit solutions. The transmitted signal, however, is analog which requires a number of analog components for processing the radio signal before conversion to or from the digital baseband representation. These analog components occur primarily in the up and down conversion of the signal to RF and IF, channel filtering and in sampling. A large proportion of the synchronization problems which arise originates from deviations and imperfections of these, which is why control of them is required.

Figure 9:
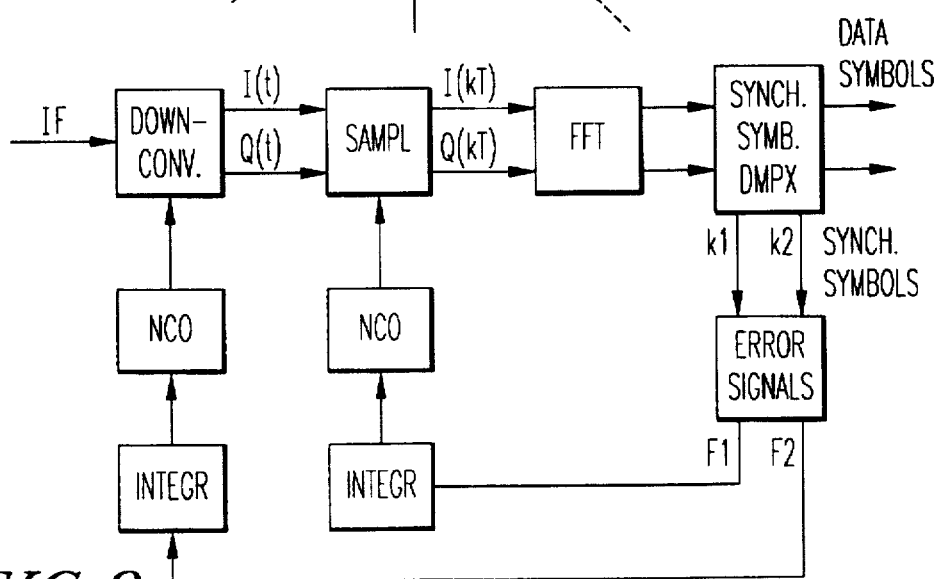
FIG. 9 is a block diagram of an arrangement for synchronizing OFDM incorporating the present invention.

The complete control system according to the invention in an OFDM receiver is shown in FIG. 9. In the figure, only the parts in the OFDM receiver are shown whose functions are essential for synchronization, that is to say receiver filters, among others, are not shown. On the left in the figure the IF signal is converted down to the baseband. This down conversion is controlled by an oscillator, the frequency of which is numerically controlled (nco—numerical controlled oscillator). Due to differences between frequencies in the transmitter and receiver and instability in crystals, the down conversion frequency must be continuously controlled by digitally varying the frequency via the nco. After down conversion to the baseband, both quadrature analog components I(t) and, respectively, Q(t) are obtained. These baseband components are then sampled to a digital representation via A/D converters. The sampling unit is also controlled by an nco. The control is necessary for being able to sample the signal at the right time and for the signal to be sampled at the right frequency. This control can be used for controlling time and sampling frequency drift.

The digital representation of the baseband signal is read in by an FFT processor, by means of which the latter carries out conversion of the time signal to the frequency domain. The received symbols in the OFDM frame are now located at a respective frequency (point) which has been calculated by the FFT processor. To be able to generate the error signals for controlling, the two known symbols are multiplexed out by a demultiplexer unit. The two known symbols k1 and k2 form the input signal to the unit for calculating the error signals F1 and F2. Before control, the errors are integrated via two digital integrators (PI control).

Figure 10:
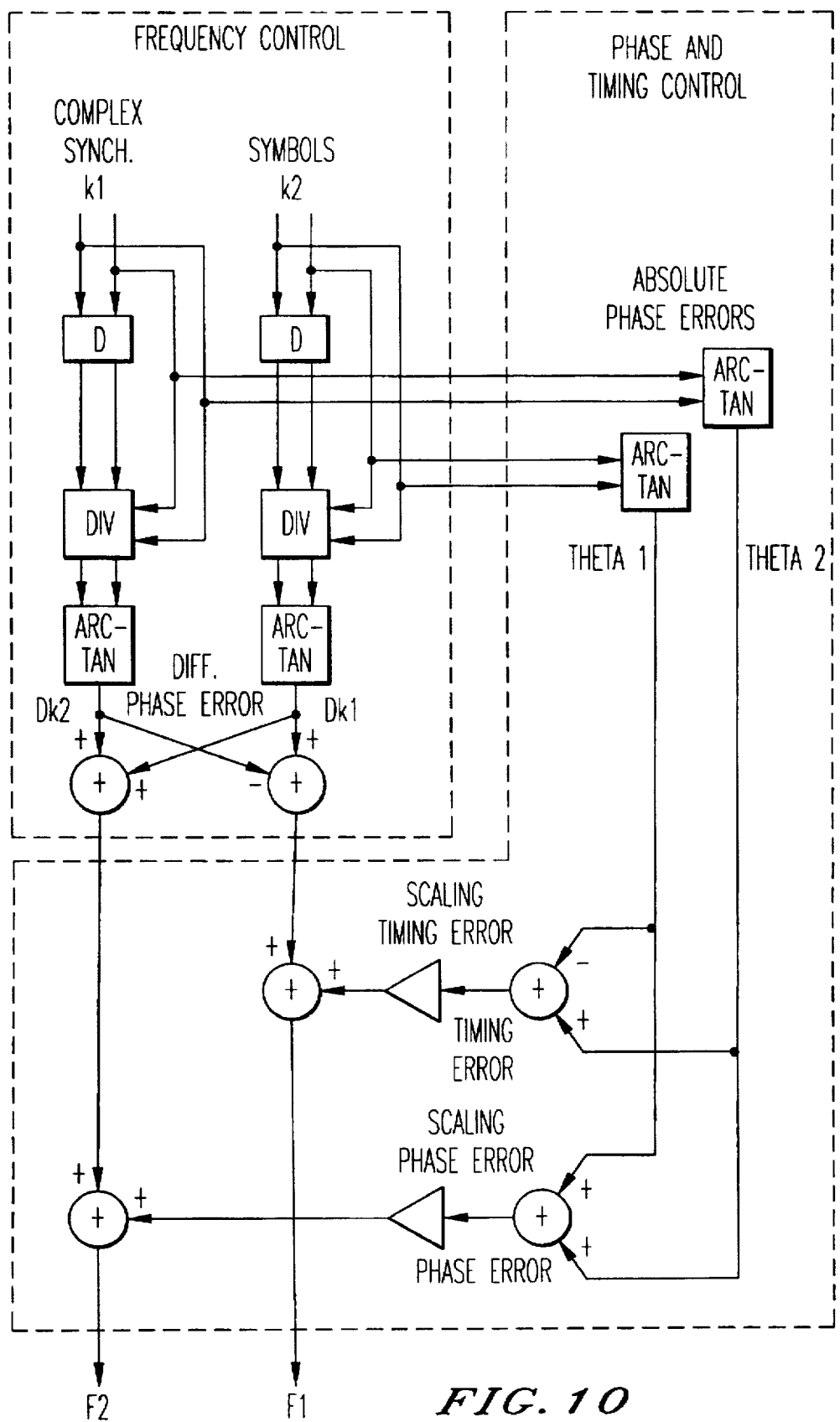
FIG. 10 is a block diagram for implementing the invention.

The control method according to the invention, described earlier, is implemented according to FIG. 10. Frequency control according to earlier techniques is found at the top left. This part however has been modified through choice of symmetrically chosen synchronization frequencies k1 and k2. Phase and time control is found on the right and in the frequency control part. The error signals F1 and F2 are the error signals which control the control of the sampling and, respectively, IF clock. F1 consists of the sum of the error of the sampling frequency and the timing error. F2 correspondingly consists of the sum of the error of the IF frequency and phase error.

Before adding the phase and timing errors to become F1 and F2, they must be scaled for the control to be balanced. Simulations show that a suitable scaling factor for phase and timing errors is 0.1. This choice of scaling factor means that the frequency control will be quicker than phase and time control.

The error signals F1 and F2 are optimally updated continuously for each OFDM frame. This updating rate can be difficult to achieve in a broadband OFDM system due to the limited calculating capacity in the existing hardware. If the control signals are updated at an interval to a number of frames, this implies that a lower band width is required for the disturbances than with continuous control of each OFDM frame.

The control method according to the invention including digital integrators includes the following calculation operations: 2 complex divisions, 4 arc-tan calculations, 8 real additions, 4 real multiplications and 4 delays (2 complex and 2 real).

Of these operations, those requiring most calculation are division of complex numbers and calculation of arc-tan. There is a number of ways to utilize methods to minimize the complexity of these operations, which must be used in an implementation, which is understood by an expert in the field. The scope of the invention is only limited by the patent claims below.

I claim:

1. A method for synchronization in OFDM (orthogonal frequency division multiplexing) modulation, whereby frequency errors in an IF (intermediate frequency) clock and a sampling clock are controlled by estimating the deviation of the sampling clock and of the IF clock for two subcarriers with different frequencies (k1 and, respectively, k2), comprising:

choosing the different frequencies (k1, k2) symmetrically around zero;

detecting absolute phase errors ($\theta 1$, $\theta 2$) for both subcarriers;

forming a timing error and a phase error from the absolute phase errors ($\theta 1$, $\theta 2$);

forming a first control signal (F1) from the deviation of the sampling clock and the timing error for controlling the sampling clock; and forming a second control signal (F2) from the deviation of the IF clock and the phase error for controlling the IF clock.

2. A method according to claim 1, wherein the timing error is calculated as the difference between the absolute phase errors ($\theta 2 - \theta 1$) and the phase error is calculated as the sum of the absolute phase errors ($\theta 1 + \theta 2$).

3. Method according to claim 2, wherein the first control signal is formed by the sum of the deviation of the sampling clock and the timing error, and that the second control signal is formed by the sum of the deviation of the IF clock and the phase error.

4. Method according to claim 3, wherein the timing error and the phase error are scaled by a suitable scaling factor before they are added to form respective control signals.

5. Method according to claim 4, wherein the scaling factor is 0.1.

6. Method according to claim 5, wherein the control signals are updated for each OFDM frame.

7. Method according to claim 4, wherein the control signals are updated for each OFDM frame.

8. Method according to claim 3, wherein the control signals are updated for each OFDM frame.

9. Method according to claim 2, wherein the control signals are updated for each OFDM frame.

10. A method according to claim 1, wherein the step of forming the first control signal comprises adding, the deviation of the sampling clock to the timing error, and wherein the step of forming the second control signal comprises adding the deviation of the IF clock to the phase error.

11. A method according to claim 10, further comprising:

scaling the timing error by a suitable scaling factor before the step of adding the deviation of the sampling clock to the timing error to form the first control signal (F1; and scaling the phase error by said suitable scaling factor before the step of adding the deviation of the IF clock to the phase error to form the second control signal (F2).

12. A method according to claim 11, wherein the suitable scaling factor is 0.1.

13. Method according to claim 12, wherein the control signals are updated for each OFDM frame.

14. A method according to one of claims 1, 2, 10, 11, and 12 further comprising updating the first and second control signals for each of at least one OFDM frame.

15. Method according to claim 11, wherein the control signals are updated for each OFDM frame.

16. Method according to claim 10, wherein the control signals are updated for each OFDM frame.

17. An arrangement for synchronizing in OFDM modulation, comprising:

a down converter for down conversion of an IF signal to baseband components;

an oscillator with an IF clock, said oscillator controlling said down converter;

an A/D (analog-to-digital) converter for digitization of the baseband components;

an oscillator with a sampling clock, said oscillator with said sampling clock controlling said A/D converter;

an FFT processor for converting the baseband components from the time domain to the frequency domain;

a demultiplexing unit for forming two subcarriers with different frequencies;

elements for forming a deviation of the sampling clock and a deviation of the IF clock;

elements for forming absolute phase errors of the two subcarriers;

elements for forming a timing error from the absolute phase errors;

elements for forming a phase error from the absolute phase errors;

elements for forming a first control signal (F1) from the deviation of the sampling clock and the timing error for controlling the sampling clock; and elements for forming a second control signal (F2) from the deviation of the IF clock and the phase error for controlling the IF clock.

18. An arrangement according to claim 17, wherein the elements for forming the absolute phase errors include an arc-tan unit, wherein the elements for forming the timing error include an adding unit for forming the difference between the absolute phase errors, wherein the elements for forming the phase error include an adding unit for forming the sum of the absolute phase errors, wherein the elements for forming the first control signal include an adding unit for adding the deviation of the sampling clock to the timing error, and wherein the elements for forming the second control signal include an adding unit for adding the deviation of the IF clock to the phase error.

19. An arrangement according to claim 18, further comprising:

a multiplication unit for multiplying the timing error by a scaling factor before addition of the timing error to the first control signal; and a multiplication unit for multiplying the phase error by said scaling factor before addition of the phase error to the second control signal.

\* \* \* \* \*